United States Patent [19]

Christopher

[11] Patent Number: 5,410,849
[45] Date of Patent: May 2, 1995

[54] MODIFIED INSULATED PANEL

[75] Inventor: Michael E. Christopher, Houston, Tex.

[73] Assignee: Texas Aluminum Industries, Inc., Houston, Tex.

[21] Appl. No.: 209,980

[22] Filed: Mar. 14, 1994

Related U.S. Application Data

[63] Continuation-in-part of Ser. No. 946,756, Sep. 17, 1992, Pat. No. 5,293,728.

[51] Int. Cl.⁶ .......................... E04B 7/00; E04B 9/00; E04C 2/00
[52] U.S. Cl. .................. 52/309.2; 52/588.1; 52/533; 52/590.3; 52/309.9
[58] Field of Search ................. 52/309.2, 309.7, 309.9, 52/309.14, 309.15, 533, 539, 588.1, 589.1, 578, 590.3

[56] References Cited

U.S. PATENT DOCUMENTS

| | | | |
|---|---|---|---|
| 3,394,513 | 7/1968 | Nerem | 52/309.2 |
| 3,415,028 | 12/1968 | Nerem | 52/309.2 X |
| 3,742,672 | 7/1973 | Schaeufele | 52/594 |
| 4,140,824 | 2/1979 | Gaillard | 52/309.7 X |
| 4,186,539 | 2/1980 | Harmon et al. | 52/580 |
| 4,443,988 | 4/1984 | Coutu | 52/309.2 X |
| 4,769,963 | 9/1988 | Meyerson | 52/309.9 |
| 5,086,599 | 2/1992 | Meyerson | 52/309.9 |
| 5,138,812 | 8/1992 | Palmersten | 52/584 |
| 5,293,728 | 3/1994 | Christopher et al. | 52/588.1 |

Primary Examiner—Carl D. Friedman
Assistant Examiner—Robert J. Canfield
Attorney, Agent, or Firm—Pravel, Hewitt, Kimball & Krieger

[57] ABSTRACT

A modular building panel having a roofing surface capable of accepting roofing shingles is disclosed, and includes two metal sheets separated by an insulating foam core bonded to the sheets and a first interlocking member on one side and a second interlocking member on the other side. A construction material capable of supporting roofing shingles by support roofing nails is positioned in a groove at the top surface of the foam core, and with the core is covered on its roofing surface by a metal sheet.

12 Claims, 2 Drawing Sheets

MODIFIED INSULATED PANEL

RELATED APPLICATIONS

This application is a continuation-in-part of U.S. patent application Ser. No. 946,756 filed Sep. 17, 1992 and issued Mar. 15, 1994 as U.S. Pat. No. 5,293,728.

TECHNICAL FIELD OF THE INVENTION

The present invention relates to insulated, thin-skinned architectural panels and, more particularly, to such panels capable of accepting roofing shingles for the construction of overhead members.

BACKGROUND OF THE INVENTION

Insulated building panels for modular construction of walls, ceilings, or the like are well known in the art. Such insulated panels are generally formed of two outer, thin-skinned metal layers of aluminum or steel having an internal, relatively thick insulating core. The concept of insulated panels has been known for many years and various types of connections have been used to connect such panels together.

Recently, a new insulated building panel was described in U.S. Pat. No. 5,293,728, which is hereby incorporated by reference for all purposes. In these panels, the outer metallic skins have on one set of edges male members or tongues and on the opposite edges female members or valleys capable of receiving the male members of an adjoining panel when the panels are connected in series. The female edge members each include a wide V-shaped valley terminating in an internally curved or curled end portion. The male member or tongue is curved back upon itself to form an internally rounded tongue member to be inserted into the V-shaped valley of the female edge connector. The male member is received by the female member by sliding the internal, curled or curved surfaces of the male member over the curled or curved surfaces of the female member until the male member rests or nests in the generally V-shaped valley of the female member to connect two adjacent panels. The panels so connected can be disconnected by pulling the panels apart, which releases the edge connection.

Such insulated building panels are useful for modular construction of walls, ceilings and the like. However, a disadvantage is that the panels cannot support roofing shingles. The foam core and metal skin construction will not retain a roofing nail, and the weight alone of the roofing shingles would cause bending and even failure of the roofing panels, particularly under strong wind.

In the instant invention, this problem has been overcome by modifying an insulated panel to enable its acceptance of roofing tiles or shingles, while maintaining the advantageous qualities of the insulated panels.

These and other objects and advantages of the invention will become apparent from the following description.

SUMMARY OF THE INVENTION

Accordingly, an insulated building panel of this invention has two metal sheets or skins separated by an insulating foam core. The foam core has two surfaces, a roofing surface and a ceiling surface. To the ceiling surface is bonded a metal sheet or skin as described in U.S. Pat. No. 5,293,728. A recess or groove in the roofing surface of the foam core receives and is bonded to a mated shingle support, formed of a construction material capable of supporting roofing shingles. An outer metal sheet or skin is bonded to the roofing surface of the foam core and its contained construction material.

The resultant modified insulated panel accepts roofing tiles or shingles, for example, composite shingles, which may be secured to the panel by roofing nails, staples, and the like.

DETAILED DESCRIPTION OF THE PREFERRED EMBODIMENT

Figure 1:
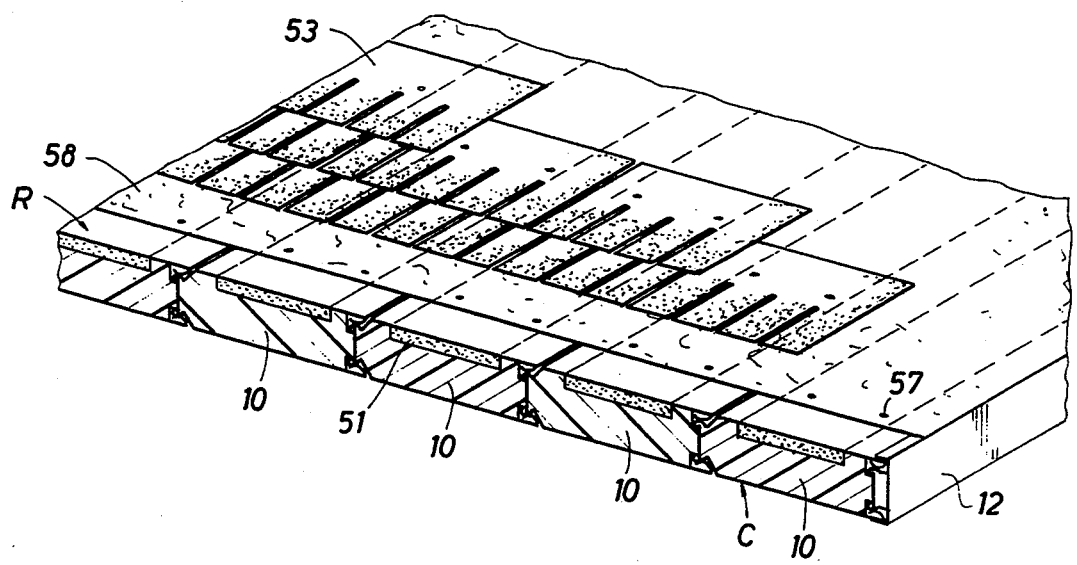
FIG. 1 is a perspective view of panels according to the present invention interlocked together in edge-to-edge connection to form a ceiling and shown with roofing shingles attached.

Referring now to FIG. 1, there is shown a series of panels 10 connected to each other by an interlock mechanism and having the construction material 51 for accepting roofing shingles. Roofing shingles 53 are shown attached to the roof R. A side receiver channel 12 and side or end receiver channels (not shown but well known in the art) are nailed or screwed to overhead beams of a building such that the panels form a combined roof R and ceiling C for a room. Panels 10 are of a length and width as required for each specific construction requirement. Typically the length l far exceeds the width w for an individual panel.

Figure 2:
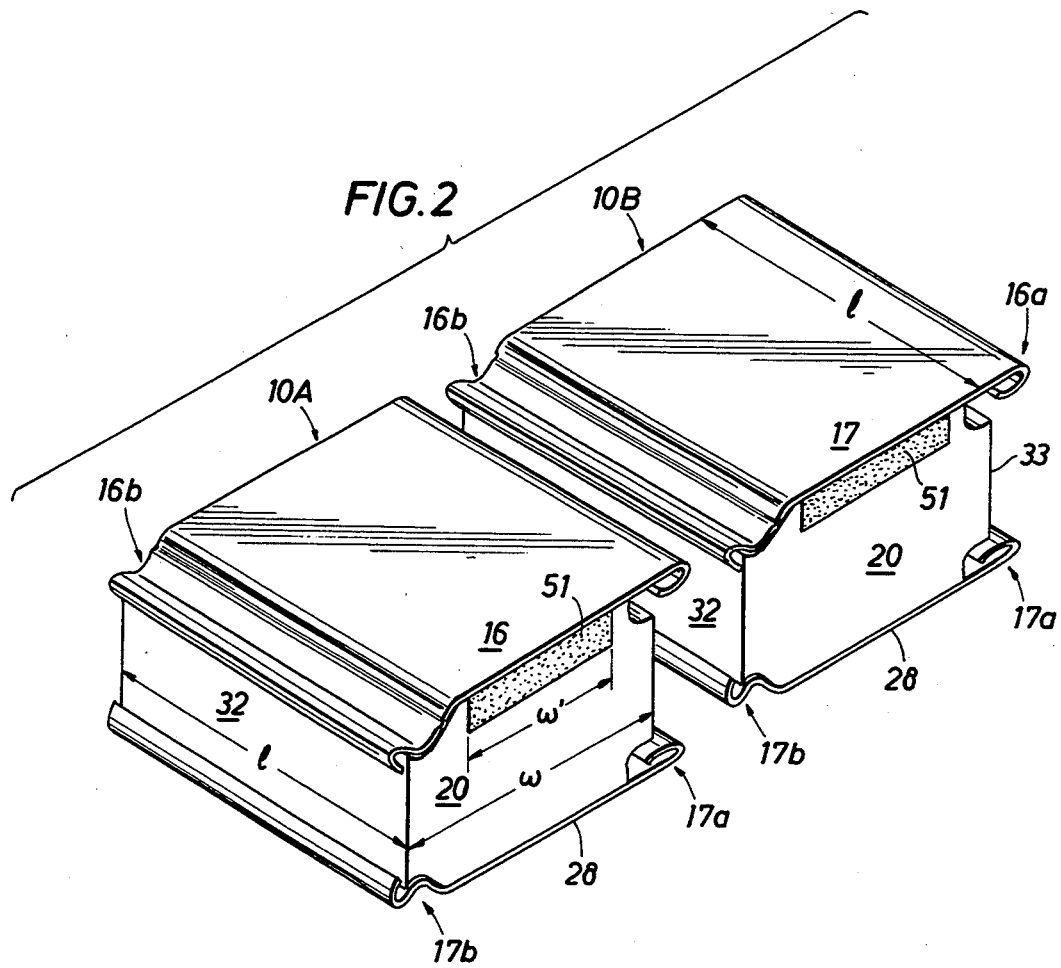
FIG. 2 is a perspective view of panel sections in adjacent position for connection together.
Figure 3:
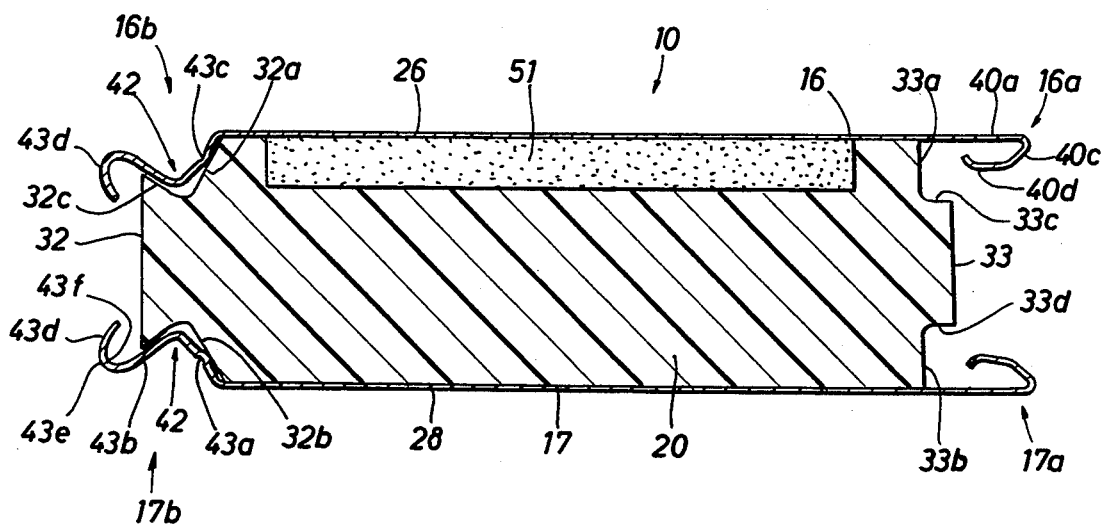
FIG. 3 is an end view in elevation of a panel.

Referring to FIGS. 2 and 3, the general structure of the panel members 10 will be described. Each panel member 10 includes first and second outer thin-skinned metal sheets 16 (top) and 17 (bottom) separated by an interior, insulated core 20. One side of each panel member 10 terminates in upper and lower male edge connectors 16a and 17a. The other side of the panel terminates in female edge connectors 16b and 17b.

Core 20 is constructed of any suitable pre-formed insulating material such as expanded polystyrene, urethane, polyisocyanate, or the like. For example, a polystyrene core width is 3" thick and having a $1\frac{1}{2}$ lb. density is one preferred core material. The core 20 can also be foamed-in-place material if designed. Core 20 has oppositely facing substantially flat, major top and bottom surfaces 26 and 28, respectively.

Side faces of the core are adapted to accommodate the design of the male-female connector system used. For example, as shown in FIGS. 2 and 3, a reduced thickness core side face 33 is located inside the male edge connectors 16a and 17a. The side face 33 is formed by a first side faces 33a and 33b which intersect the flat core top 26 and bottom 28 at 90° angles. Outwardly projecting shoulders 33c and 33d extend from side faces 33a and 33b to form the side face 33 which extends the length of the panel. Reduced thickness core side face 32 is located internally of female edge connectors 16b and 17b. The side face 32 is formed in conjunction with a V-shaped core groove or valley on 32a formed by inclined surfaces 32b and 32c in both the upper and lower core surfaces 26 and 28. The inclined surfaces 32b and 32c intersect to form the core V-shaped valleys 32a which run the length of the panels 10.

The core 20 has a roof or upper surface 52 having a generally rectangular groove or recess formed therein. A generally rectangular plate or board-shaped member 51 is positioned in the groove 54. The groove 54 and its mated shingle support 51 generally extend through the core 20 along both the length l and the width w' of the panel. However, the width w' of the shingle support is less than the width w of the core 20, the side faces or edges 55, 56 of the shingle support 51 generally being positioned at least about 1–4 inches from the side faces 32, 33 of the core forming border portion B.

The shingle support 51 has a height or thickness h' sufficient to receive a half-inch roofing nail 57 or 3/16 inch staple. The single support 51 is bonded to the core 20 and the core-shingle support assembly is bonded to the outer metal skin, for example, using a laminating adhesive. The preferred laminating adhesive is that produced by Morton Thokol (Houston, Texas) under the trade name MorAd.

The single support 51 may be formed of any construction material having sufficient strength to accept and retain roofing materials such as roofing nails, for example, pressboard, plywood, laminates, and the like. Because it is light weight, strong, and economical, strandboard is one preferred material.

It is understood that the shingle support 51 may extend in the core 20 in varied lengths and widths, provided it does not interfere with the connector system of the panels, and provided it gives sufficient area for fixing roofing shingles. For example, while the panel 51 may extend over 100% of the length and width of the core, the preferred embodiment illustrated in the drawings shows a single, solid panel of construction material extending substantially 100% of the length and approximately 90% of the width of the insulated panel. The reduced width prevents interference with the connector system, and permits retention of the flexibility and easy connection of the panels. It is contemplated that the construction material may be present as one or more strips in the core, positioned for adequate fixing of normally sized roofing shingles. In like manner, the dimensions of the shingle support, h', l', and w' are limited by the need for placement of roofing nails, and the like, and by the flexibility and other needs of the connector system employed.

The resulting insulated panel 10 of this invention includes a core 20 having a grooved roofing surface 54, in which a shingle support 51 is bonded. Metal sheets or skins 16, 17 are bonded to both the roofing surface R and the ceiling surface C of the core-shingle support assembly. Roofing shingles 53 may be attached to this modified panel, as shown in FIG. 1. Preferably, tar paper 58 is fixed to the roofing surface R and shingles 53 are fixed using, for example, roofing nails 57.

Metal sheets or panels 16 and 17 are thin sheets of flexible metal, which may be aluminum or even steel. Panels having a thickness of 0.025 or 0.32 are preferred if aluminum. Top metal sheet 16 has a generally rectangular flat section such that its underside is intimately attached to top core—shingle acceptor surface 26 by a suitable glue as is known to persons of ordinary skill in this art. It is preferred that this material be a laminating adhesive, e.g., MorAd, as described above. Bottom metal sheet 17 is a mirror image of top metal sheet 16 and, as such, it is shaped to conform with and to be attached to core bottom 28 by a suitable glue preferably a laminating adhesive as described above.

In the preferred connector design, the male edge configurations of connectors 16a and 17a extend laterally outwardly from the reduced thickness core side face 33. The male connector 16a includes a flat section 40a joined with a first internally bent surface 40c which is further joined to inside surface 40d, which are formed by bending the previously flat side edge back upon itself. The generally internally curved configuration of the male edge connector 16a is formed utilizing a roll-forming machine as is known in the art. The male connector 17a on metallic sheet 17 is formed in a similar manner and thus the same numbers 40a, 40c and 40d will apply to the same surface elements. It should be noted that the interior core side face 33 is positioned inside of the internal surfaces 40c and 40d of the male connectors 16a and 17a thereby minimizing exposure of the core surface 33 to the dangers of damage during shipment and the like.

The configurations for the female connectors 16b and 17b are also formed on a roll-forming machine. The female connector 16b includes a generally V-shaped externally facing valley designated as 42 which is to receive the internal surfaces 40c and 40d of the male connector members 16a and 17a. The V-shaped valley 42 of the female connectors 16b and 17b is formed by a first internally inclined surface 43a which is intercepted by a second inclined surface 43b. The first inclined surface 43a includes an additional bend at 43c, which acts as an air escape to be further described. The intercepting inclined surface 43b, which inclines outwardly, includes an internally curled end portion 43d, which forms an externally facing curved surface 43e and internally facing curved surface 43f. The curved or curled end portion 43d of the female connectors 16b and 17b extends beyond the core face 32, thereby protecting the core face 32 from damage during shipment or otherwise. The angle of the bend of the female connector surfaces 43a is inclined slightly less than the angle of incline of the core surfaces 32b such that a V-shaped space is created between the female connectors and the V-shaped valley 32a in the core. This allows the female members to flex inwardly when the male connectors 16a and 17a are inserted into the female connectors 16b and 17b or to be adjusted as to distance between the female connectors as will be further described hereinafter.

Figure 4:
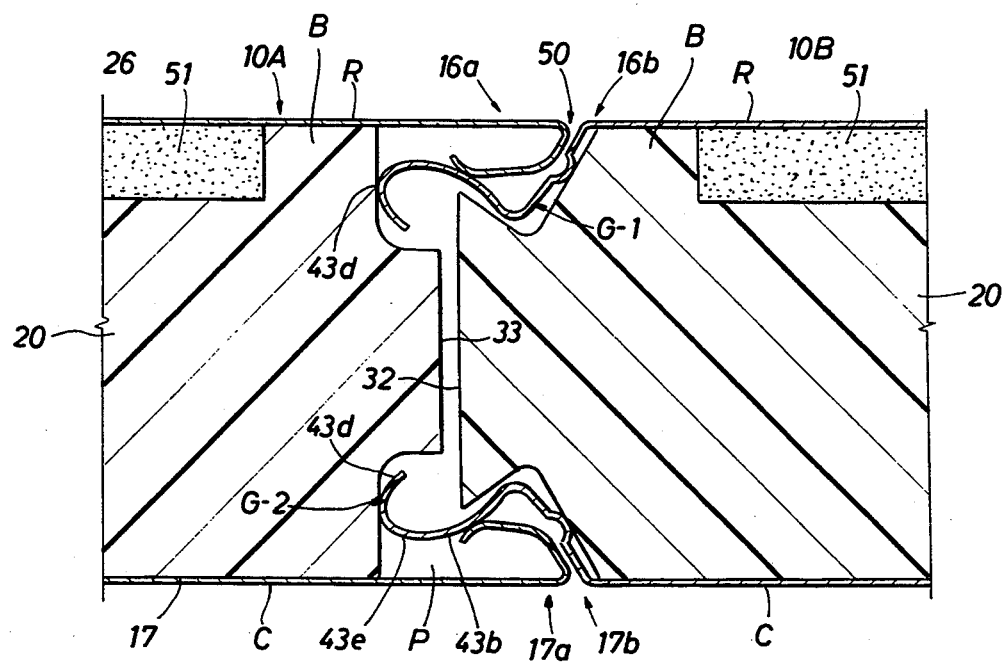
FIG. 4 is an enlarged sectional view showing the interlock of connector elements between two adjacent panels.

Referring to FIGS. 2–4, the panels 10 are connected together in the following manner. As referred to in FIGS. 2 and 4, panel members 10A and 10B are positioned adjacent to each other for connection by pressing or sliding the panels together while the panels are held in generally the same plane. Therefore, it is not necessary that one panel be held cocked at an angle with respect to the other panel to connect the panels together in that they may be connected together while in substantially the same plane by pressing them against each other.

Referring to FIG. 2, the panels 10A and 10B appear to be almost square in shape. This of course is just an example. It is more typical for the panels to be rectangular with the long side l running along the length of the male and female connectors. For example, it is not unusual for the length of the panels to be 8' or more, such as for example, 20'. In these examples, the length of the male connectors 16a and 17a and the female connectors 16b and 17b would substantially match the length of the panel and thus be 8' or 20'.

As the panels are pressed together, the inside surfaces 40c and 40d of the male connectors which cooperate to form an internal curved surface, press against the exterior surface 43e of the internally curved or curled end portion 43d of the female connectors 17b causing the female connectors to temporarily deflect inwardly or internally slightly like a spring so that the male connectors 16a and 17a may enter or slide into the V-shaped valley areas 42 of the female connectors 16b and 17b. This spring cantilever deflection is allowed and encouraged by the elongated V-shaped cavity or space described earlier between the V-shaped core valleys 32a formed by core surfaces 32b and 32c and the V-shaped connector valleys formed by connector surfaces 43a and 43b. Internal deflection of the female connector members 16b and 17b is more desirable than external deflection of the male connectors 16a and 17a. For if the male connectors 16a and 17a were to deflect outwardly too far, the connectors could push outwardly the actual flat portions of the metallic skins 16 and 17 and cause delamination of the metallic skins 16 and 17 from the core surfaces 26 and 28, respectively.

When the male connectors 16a are seated or nested in the V-shaped valleys 42 of the female connectors 16b and 17b, they are in the relative positions illustrated in FIG. 4. As one may observe, the core surfaces 33 on the male connector side and 32 on the female connector side are designed to touch or almost touch when the male connectors are positioned within the female connectors. The virtual touching of the core surfaces 32 and 33 provide for better insulation than if there were a substantial air gap in this region. Given the lack of dimensional uniformity inherent in the manufacture of core material, it is almost impossible to guarantee in each instance that the core faces 32 and 33 will actually touch each other in every connection. It is sufficient to say that the core faces will either touch or be in such proximity as to substantially increase the regional insulating properties as compared to the circumstance where the core faces would be substantially apart.

One of the advantages of the configuration for the curvilinear male and female tongue and groove or valley connectors on the panels of this invention is that the panels may be taken apart by pulling one panel with respect to the other in virtually the same plane in which the panels were put together in the first place. This is a sharp contrast from the requirement that the panels be pulled apart by sliding them along their length, which is necessary in the connector design of U.S. Pat. No. 4,769,963 previously discussed.

It is not necessary to use caulk or sealant with this design. This is particularly advantageous since caulks are often not uniformly applied in the field and also deteriorate over time, which requires expensive service calls to repair any leaking areas.

One of the major problems with the utilization of pre-fabricated insulation panels, such as described in the prior art and in this application, is leakage and condensation. Leakage occurs whenever the connection or joint actually passes water all the way from the roof side R to the ceiling side C, such as for example during rain. Many of the prior art connectors utilize caulk or sealant to prevent leakage. As previously described, caulk and sealant have disadvantages in that they tend to deteriorate over time, thus increasing the chance for leakage.

The environment for condensation problems is as follows. When insulated panels are used as combination roof and ceiling members, the upper metallic skin 16 as a roof member R is exposed to outside weather and the bottom metallic skin 17 functioning as a ceiling member C is exposed to temperatures of the room, which may be approximately 72°. In circumstances where a cold rain falls, rain can in other panels leak through the panel and rest on the upper surface of the bottom metallic skin 17. Even though this cold rain water may not leak through such a panel, the cold water will reduce the temperature of the bottom panel skin sufficiently to cause condensation on the underside of the bottom panel, condensation of moisture from the air within the room. This condensation may build up and actually drip on the floor and furniture and is thus highly undesirable.

A double gutter system is provided to eliminate leak and condensation. Referring to FIG. 4, the first gutter G-1 is a triangular cavity (as seen in cross-section) formed by the V-shaped valley 42 provided by the female connector 16b on panel 10b in cooperation with the internal surface 40d of the male connector 16a. Water will collect within this triangular cavity G-1 which runs the length of the panel and will actually flow outwardly to the ends of the panel thus eliminating any further intrusion of water into the connected panels under many circumstances. (The water will normally flow outwardly because of the typical pitch of the roof, which is about ¼" of height per foot of length. The inclined surface 43a of the female connectors 16b and 17b have an elongated depression 43c which acts as an air escape as the gutter G-1 becomes filled with water and thus pushes out the air in the gutter. However, when the rainfall rate increases and exceeds the capacity of the triangular cavity or gutter G-1 to eliminate the collection of water, the water will overflow up over the internally curved portion 43d of the female connector 16b and the water will flow or trickle downwardly between the core section faces 32 and 33, landing in the upper, curved gutter recess G-2 formed by the internal curved surface 43f of the curled end portion 43d of the bottom female connector 17b on panel 10b. As can be seen in FIG. 4, the relative depth of the second gutter G-2 formed by the internally curved portion 43d is at least as great as the depth of the first gutter G-1 so that at least as much water may be collected in the second gutter G-2 and flow outwardly as was collected in the first gutter G-1. Thus this second or emergency gutter G-2 takes care of rain overflow situations.

However, there is still the problem of condensation. For example, in very cold weather where inside temperatures may be 72° F. and outside temperatures 20°, the freezing rain or snow may settle in the second gutter and cause a cooling of the ceiling if the ice is too close to the surface forming the ceiling C. Referring to FIG. 4, it is noted that the metallic skin surfaces 43b and 43d which form the second or emergency gutter G-2 are spaced from the flat surface 17 of the bottom male connector 17a to provide an elongated air pocket P extending the length l of the panels. The air pocket P serves to insulate the cold temperature of the water or ice in the gutter G-2 formed by portions 43d and 43e from the flat surface 17b of the bottom metallic skin thereby preventing the temperature of the bottom metallic skin 17 from falling to a point that condensation is induced in the room.

The configuration of the female connectors 16b and 17b in cooperation with the V-shaped clearance due to the spacing of core surfaces 32b and 32c have an additional advantage of adjustability. The actual angle between rolled surface 43a and the flat portion of each skin can vary from one female connector 16b or 17b to another due to manufacturing tolerances. The spring cantilever effect of the connectors 16b and 17b allows the worker at the job site to adjust the distance between the exterior surface portion 43e by firmly squeezing the curled end portion closer together if the fit with the male connectors is otherwise too tight. Also, if there is too much space in the gap 50 between the protruding end of the male connectors and the bending point on the female connectors, the curled ends 43d can be pulled apart to move the nested position of the male connectors closer to the surface 43a and thus in a more flush position. In each case, whether squeezing or pulling apart, sufficient force is exerted to permanently deform the female connectors to their new, adjusted position.

The foregoing disclosure and description of the invention is illustrative and explanatory thereof. Various changes in the details of the illustrated construction, the described method, or the materials used, can be made within the scope of the appended claims without departing from the true spirit of the invention.

For example, the term "ceiling" as used throughout this description applied not only to the actual ceiling of a room but also to any other lower surface provided by the bottom skin 17. Also, while the preferred embodiment has been described as particularly beneficial for retaining roof shingles, other roof mounted covering such as tiles are supportable by this invention, as well as actual roof structures.

What is claimed is:

1. An insulated building panel connectable to a like adjacently positioned second insulated panel to form a roof member for receiving a roofing surface for a building system, the panel comprising:
   a central core of insulating material including first and second major, lateral, flat surfaces extending between side faces wherein one of said lateral surfaces comprises a roofing surface and the other comprises a ceiling surface, said roofing surface having a generally rectangular singular recess extending generally across it therein;
   shingle support member fitted in said recess of said core for receiving and retaining roofing shingle fasteners; and
   first and second relatively thin, substantially flat and oppositely positioned metallic sheets bonded to said first and second major flat surfaces of the core and to the shingle support member, the metallic sheets forming male and female side edge connectors adapted to be respectively joined to female and male side edge connectors of a like adjacently positioned panel to form a building system;
   said central core having a border portion between said recess and said side faces for compressible support of said metallic sheets during their flexure when connecting and disconnecting with like adjacently positioned panels.

2. The panel of claim 1, wherein said shingle support member is a construction material having sufficient strength to accept and retain a roofing nail or staple.

3. The panel of claim 1, wherein said shingle support member material is strandboard.

4. The panel of claim 1, wherein said shingle support member is bonded to said core by means of a laminating adhesive.

5. The panel of claim 1, wherein said shingle support member is a construction material having a length substantially equal to that of the core, a width substantially equal to about 90% of the width of the core.

6. The panel of claim 1, wherein said shingle support member is a material selected from the group consisting of plywood, pressboard, strandboard, and wood laminates.

7. A building system including at least two panels as set forth in claim 1,
   said panels being adjacently positioned substantially horizontally to serve as a combination roof and ceiling member such that said first or top metallic sheet of each panel serves as a roof and said second or bottom metallic sheet of each panel serves as a ceiling,
   wherein said shingle support member for attaching roofing shingles is positioned between said top metallic sheet and said core.

8. An insulated building panel connectable to a like adjacently positioned second insulated panel to form a roof member for receiving a roofing surface for a building system, the panel comprising:
   a central core of insulating material including first and second major, lateral, flat surfaces extending between side faces wherein one of said lateral surfaces comprises a roofing surface and the other comprises a ceiling surface, said roofing surface having a generally rectangular singular recess extending generally across it therein;
   shingle support member fitted in said recess of said core for receiving and retaining roofing shingle fasteners; and
   first and second relatively thin, substantially flat and oppositely positioned metallic sheets bonded to said first and second major flat surfaces of the core and to the shingle support member, the metallic sheets forming male and female side edge connectors adapted to be respectively joined to female and male side edge connectors of a like adjacently positioned panel to form a building system;
   said central core having a border portion between said recess and said side faces for compressible support of said metallic sheets during their flexure when connecting and disconnecting with like adjacently positioned panels;
   said male side edge connectors being formed integrally with said oppositely positioned thin metallic sheets to form mirror image male connectors, each of said male connectors including an internal, generally convex curved surface;
   said female side edge connectors being formed integrally with said oppositely positioned thin metallic sheets to form mirror image female connectors, said female connectors including a externally facing generally V-shaped valley formed with an internally curled end portion which provides an externally curved connector area and which terminates outwardly spaced from a side edge of said central core;
   said internally curved surfaces of said male connectors of said panel being capable of sliding over externally curved connector areas of internally curled end portions of female connectors of a like adjacently positioned panel such that said internal curved surfaces of said male connectors are adapted to nest in said V-shaped valleys of female connectors of a like adjacently positioned panel, one of said side faces of a like adjacently positioned panel core being positionable substantially adjacent to a side face of said central core of said panel, said V-shaped valley on an upper female connector adapted to cooperate with an internal, generally curved surface of an upper male connector of a like adjacent panel to form an elongated space which functions as a first gutter system, and said internally curved end portion of a bottom female connector functioning as a second gutter system to avoid or minimize leakage and condensation whenever said panel is used with an adjacent like panel as combination roof and ceiling members.

9. A building system including at least two panels as set forth in claim 8:

said panels being adjacently positioned substantially horizontally to serve as a combination roof and ceiling member such that said first or top metallic sheet of each panel serves as a roof and said second or bottom metallic sheet of each panel serves as a ceiling, one of said male connectors extending from said top metallic sheet and the other of said male connectors extending from said bottom metallic sheet of each panel, one of said female connectors extending from said top metallic sheet and the other of said female connectors extending from said bottom metallic sheet of each panel;

said panels being joined such that said internally curled end portion of said bottom female connector forming said second gutter system of one panel is spaced from a bottom surface of a joined male connector of another panel to create an insulating air space to prevent the formation of condensation on the bottom surface of said panel; and wherein each shingle support member for attaching roofing shingles is positioned between its respective top metallic sheet and core.

10. The structure set forth in claim 8, including:

said side faces of said insulating core being generally aligned with said male and female connectors on said panel but being positioned inside of said male and female connectors to avoid damage to said core of said panel, said side faces being located substantially adjacent to an opposing side face of alike adjacent panel when panels are joined to form a building system.

11. The structure set forth in claim 10 including:

said internally curled end portion of said bottom female connector of said panel being positioned below said core side faces of said panel to receive water flowing down said core side faces and function as the second gutter system.

12. The structure set forth in claim 8, including:

said major surfaces of said insulating core, as viewed in cross-section, including substantially V-shaped valleys which are aligned with said V-shaped valleys of said female connector such that an elongated V-shaped gap is formed therebetween to allow said female connectors to temporarily deflect inwardly whenever male connectors of a like adjacent panel begin sliding into connection with said female connectors of said panel.

* * * * *